US012519252B2

(12) United States Patent
Yamada et al.

(10) Patent No.: US 12,519,252 B2
(45) Date of Patent: Jan. 6, 2026

(54) ANTENNA MODULE AND COMMUNICATION DEVICE EQUIPPED THEREWITH

(71) Applicant: Murata Manufacturing Co., Ltd., Nagaokakyo (JP)

(72) Inventors: Yoshiki Yamada, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 80 days.

(21) Appl. No.: 18/442,131

(22) Filed: Feb. 15, 2024

(65) Prior Publication Data

US 2024/0186723 A1 Jun. 6, 2024

Related U.S. Application Data

(63) Continuation of application No. PCT/JP2022/030092, filed on Aug. 5, 2022.

(30) Foreign Application Priority Data

Sep. 9, 2021 (JP) ................................ 2021-146760

(51) Int. Cl.
*H01Q 21/28* (2006.01)
*H01Q 9/04* (2006.01)
*H01Q 21/06* (2006.01)

(52) U.S. Cl.
CPC ........... *H01Q 21/28* (2013.01); *H01Q 9/0485* (2013.01); *H01Q 21/065* (2013.01)

(58) Field of Classification Search
CPC ........ H01Q 1/243; H01Q 5/42; H01Q 9/0485; H01Q 21/065; H01Q 21/08; H01Q 21/24; H01Q 21/28
See application file for complete search history.

(56) References Cited

U.S. PATENT DOCUMENTS

2021/0083380 A1* 3/2021 Takayama ................ H01Q 5/28

FOREIGN PATENT DOCUMENTS

JP 2021-016198 A 2/2021
WO 2016/063748 A1 4/2016
(Continued)

OTHER PUBLICATIONS

International Search Report and Written Opinion mailed on Nov. 1, 2022, received for PCT Application PCT/JP2022/030092, filed on Aug. 5, 2022, 9 pages including English Translation.

*Primary Examiner* — Hoang V Nguyen
(74) *Attorney, Agent, or Firm* — XSENSUS LLP

(57) ABSTRACT

An antenna module includes dielectric substrates whose normal directions are different from each other, emitting elements disposed on the dielectric substrate, and emitting elements disposed on the dielectric substrate. The emitting element and the emitting element are capable of emitting radio waves of a first frequency band. The emitting element and the emitting element are capable of emitting radio waves of a second frequency band higher than the first frequency band. The emitting element is disposed adjacent to the emitting element in a case where the dielectric substrate is viewed in a plan view from the normal direction. On the dielectric substrate, the emitting element is disposed at a position that is farther from the dielectric substrate than the emitting element is.

19 Claims, 5 Drawing Sheets

(56) References Cited

FOREIGN PATENT DOCUMENTS

| | | | |
|---|---|---|---|
| WO | 2018/230475 | A1 | 12/2018 |
| WO | 2020/170722 | A1 | 8/2020 |
| WO | 2020/261807 | A1 | 12/2020 |
| WO | 2020/261920 | A1 | 12/2020 |
| WO | 2021/038965 | A1 | 3/2021 |

* cited by examiner

FIG.3
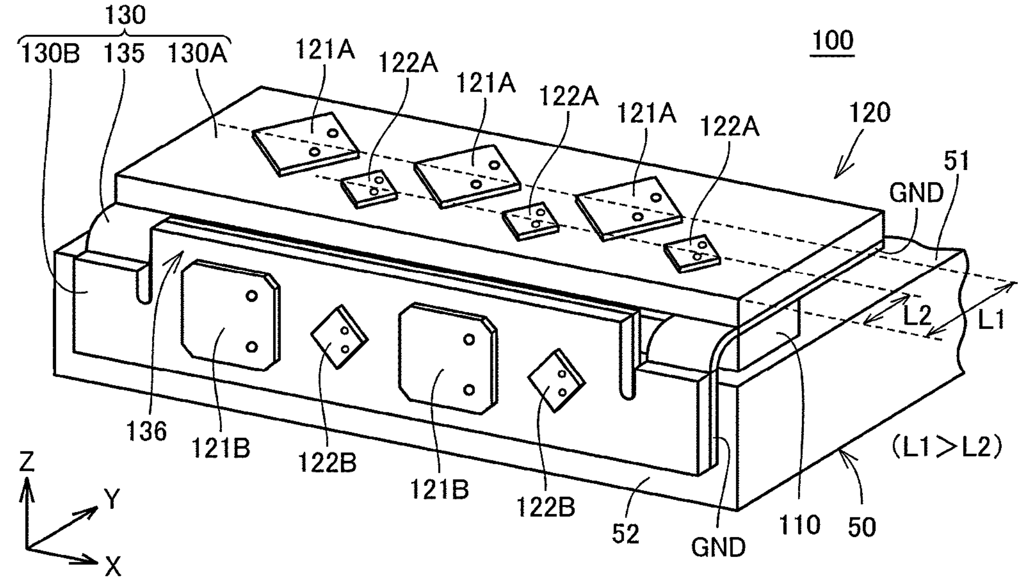
FIG.4
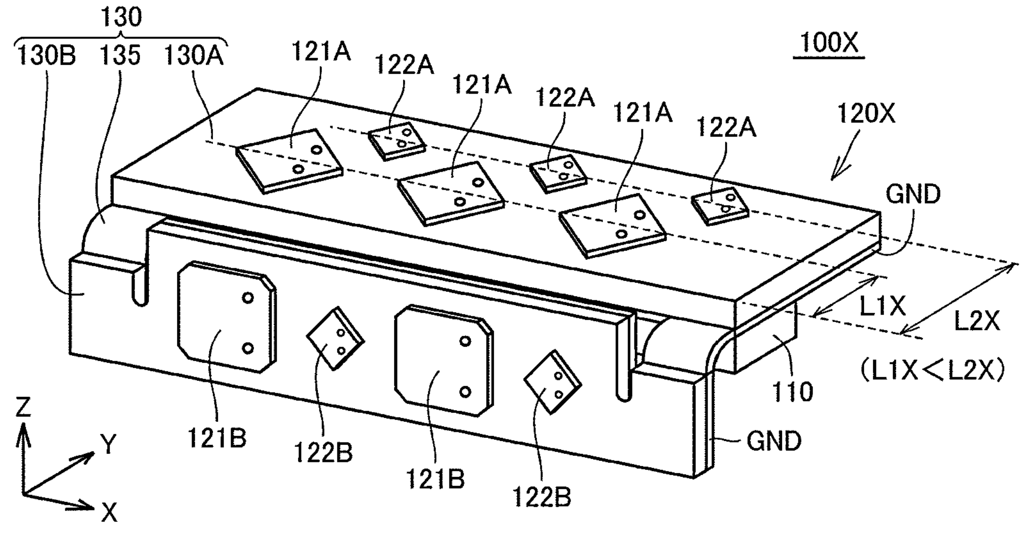
FIG.5
| | 28GHz | 39GHz |
|---|---|---|
| EMBODIMENT | 30dB | 27dB |
| COMPARATIVE EXAMPLE | 25dB | 29dB |

ANTENNA MODULE AND COMMUNICATION DEVICE EQUIPPED THEREWITH

CROSS-REFERENCE TO RELATED APPLICATIONS

This is a continuation application of PCT/JP2022/030092, filed on Aug. 5, 2022, designating the United States of America, which is based on and claims priority to Japanese Patent Application No. JP 2021-146760 filed on Sep. 9, 2021. The entire contents of the above-identified applications, including the specifications, drawings and claims, are incorporated herein by reference in their entirety.

TECHNICAL FIELD

The present disclosure relates to an antenna module and a communication device equipped therewith, and more specifically to technology for improving the antenna characteristics of an antenna module capable of emitting radio waves in two directions.

BACKGROUND ART

International Publication No. 2020/170722 (Patent Document 1) discloses an antenna module in which emitting elements are disposed on two surfaces of a dielectric substrate having a flat plate-like shape folded into a substantially L shape, the two surfaces having different normal directions. In the antenna module disclosed in Patent Document 1, radio waves can be emitted in different directions from the emitting elements on the respective surfaces of the dielectric substrate.

CITATION LIST

Patent Document

Patent Document 1: International Publication No. 2020/170722

SUMMARY OF DISCLOSURE

Technical Problem

Antenna modules as described above may be used in mobile communication devices such as, typically, cellular phones or smartphones. In recent years, such mobile communication devices have been communicating using radio waves of a plurality of frequency bands corresponding to different communication standards. In this case, emitting elements corresponding to the individual frequency bands are disposed on the individual surfaces of the dielectric substrate.

In a case where the emitting elements corresponding to different frequency bands are disposed adjacent to each other on the individual surfaces of the dielectric substrate, the emitting elements need to be disposed in the limited space of the dielectric substrate, which may lead to a state where the emitting elements need to be disposed at a high density. Assuming this is the case, the emitting elements disposed on different surfaces of the dielectric substrate will be close to each other, and the isolation characteristics between these emitting elements may decrease.

The present disclosure has been made to solve such a problem, and a purpose of the present disclosure is to suppress deterioration of isolation characteristics between emitting elements disposed on the individual surfaces of the dielectric substrate in an antenna module capable of emitting radio waves in two different directions.

Solution to Problem

An antenna module according to the present disclosure includes a first substrate and a second substrate, whose normal directions are different from each other, a first emitting element and a second emitting element, which are disposed on the first substrate, and a third emitting element and a fourth emitting element, which are disposed on the second substrate. The first emitting element and the third emitting element are capable of emitting radio waves of a first frequency band. The second emitting element and the fourth emitting element are capable of emitting radio waves of a second frequency band higher than the first frequency band. The second emitting element is disposed adjacent to the first emitting element in a case where the first substrate is viewed in a plan view from the normal direction. On the first substrate, the first emitting element is disposed at a position that is farther from the second substrate than the second emitting element is.

Advantageous Effects of Disclosure

With the antenna module according to the present disclosure, on the first substrate side, the emitting element for the lower frequency band is disposed at a position that is farther from the second substrate than the emitting element for the higher frequency band is. The wavelength of radio waves emitted from the emitting element for the lower frequency band is longer than that of radio waves emitted from the emitting element for the higher frequency band, and thus the emitting element for the lower frequency band is likely to have a greater effect on the emitting elements on the second substrate side. Therefore, by disposing the emitting element for the lower frequency band at a position that is relatively farther from the second substrate, the deterioration of isolation characteristics can be suppressed between the emitting elements on the first substrate side and the emitting elements on the second substrate side.

BRIEF DESCRIPTION OF DRAWINGS

FIG. 3 is a perspective view of the antenna module according to the embodiment.

FIG. 4 is a perspective view of an antenna module according to a comparative example.

FIG. 5 is a diagram for describing isolation characteristics in antenna modules according to the embodiment and comparative example.

DESCRIPTION OF EMBODIMENTS

Figure 1:
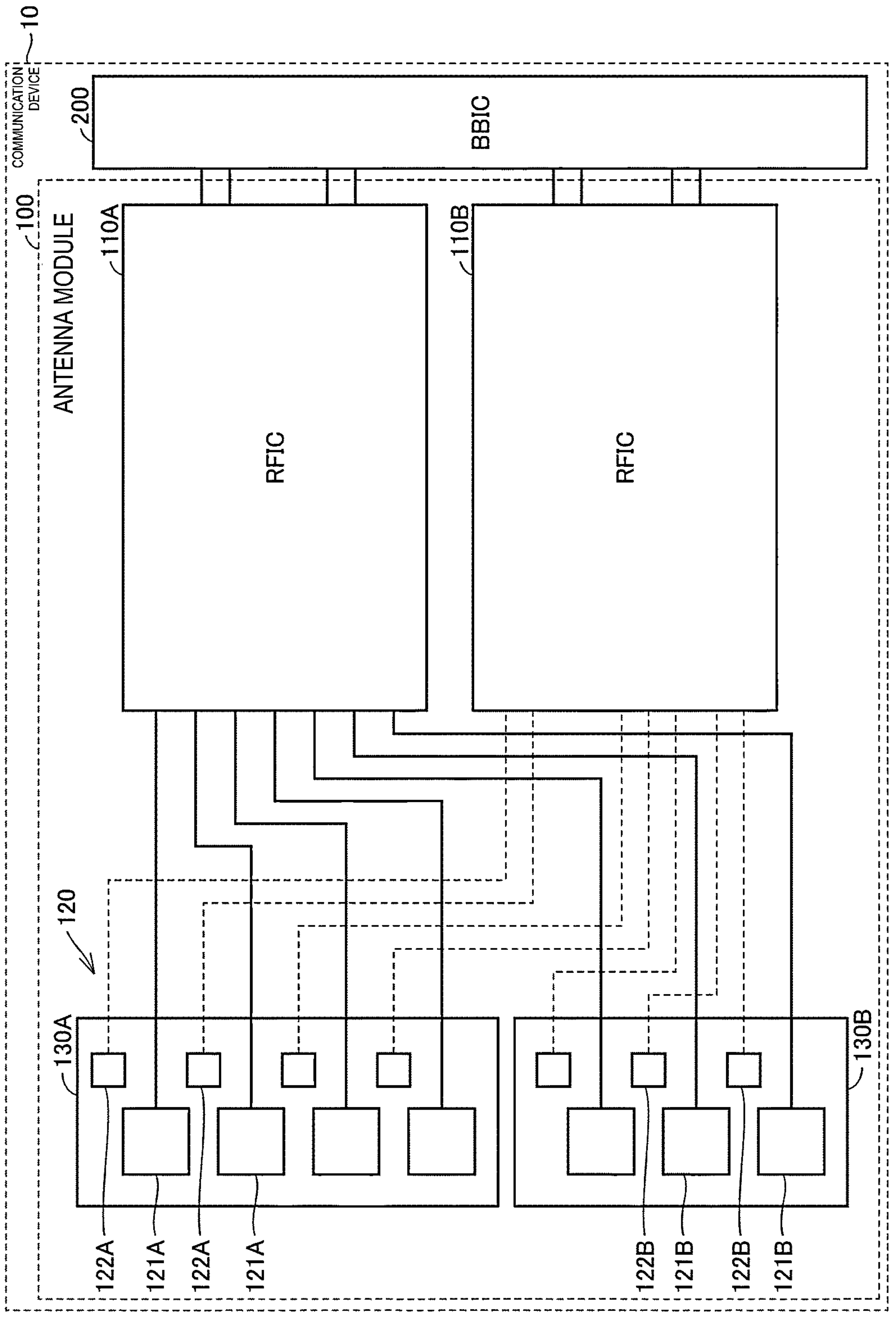
FIG. 1 is a block diagram of a communication device to which an antenna module according to an embodiment is applied.

In the following, an embodiment of the present disclosure will be described in detail with reference to the drawings. Note that identical or equivalent portions in the drawings are marked with the same symbols and description thereof is not repeated.

EMBODIMENT (Basic Configuration of Communication Device)

FIG. 1 is a block diagram of a communication device 10 to which an antenna module 100 according to the present embodiment is applied. The communication device 10 is, for example, a mobile terminal, such as a cellular phone, a smartphone, or a tablet, or a personal computer with communication functions. An example of the frequency band of radio waves used for the antenna module 100 according to the present embodiment is a millimeter wave band. Examples of the center frequency of the millimeter wave band are 28 GHz, 39 GHz, and 60 GHz. However, radio waves in frequency bands other than those described above are also applicable.

With reference to FIG. 1, the communication device 10 includes the antenna module 100 and a baseband integrated circuit (BBIC) 200 constituting a baseband signal processing circuit. The antenna module 100 includes radio frequency integrated circuits (RFICs) 110A and 110B, which are examples of a power feed circuit, and an antenna device 120. The communication device 10 up-converts signals transmitted from the BBIC 200 to the antenna module 100 into radio frequency signals and emits the radio frequency signals from the antenna device 120, and also down-converts radio frequency signals received by the antenna device 120 and processes the signals using the BBIC 200. Note that the RFICs 110A and 110B may be collectively called an "RFIC 110" in the following description.

The antenna device 120 includes two dielectric substrates 130A and 130B. A plurality of emitting elements are disposed on each dielectric substrate. More specifically, in the example illustrated in FIG. 1, an emitting element 121A and an emitting element 122A are disposed on a dielectric substrate 130A, the emitting elements 121A and 122A each including four electrodes. An emitting element 121B and an emitting element 122B are disposed on a dielectric substrate 130B, the emitting elements 121B and 122B each including three electrodes. Note that the number of emitting elements disposed on each dielectric substrate is not limited to the above-described number.

Each of the dielectric substrates 130A and 130B has a substantially rectangular shape. The plurality of electrodes of each of the emitting elements 121A and 122A are arranged in a row along the long side of the dielectric substrate 130A. The individual electrodes of the emitting elements 121B and 122B are arranged in a row along the long side of the dielectric substrate 130B.

In the present embodiment, each electrode of the emitting elements 121A, 122A, 121B, and 122B is a planar patch antenna having a substantially square shape. The electrode sizes of the emitting elements 121A and 121B (the lengths of the sides of the electrodes) are larger than those of the emitting elements 122A and 122B. Thus, the frequency bands of radio waves emitted from the individual electrodes of the emitting elements 121A and 121B are lower than those of radio waves emitted from the individual electrodes of the emitting elements 122A and 122B. That is, the antenna module 100 is a so-called dual-band antenna module capable of emitting radio waves of two different frequency bands. In the example in the present embodiment, the center frequency of radio waves emitted from the emitting elements 121A and 121B for the lower frequency band is 28 GHz, and the center frequency of radio waves emitted from the emitting elements 122A and 122B for the higher frequency band is 39 GHz.

To the emitting elements 121A and 121B for the lower frequency band, radio frequency signals are supplied from the RFIC 110A. In contrast, to the emitting elements 122A and 122B for the higher frequency band, radio frequency signals are supplied from the RFIC 110B.

Figure 2:
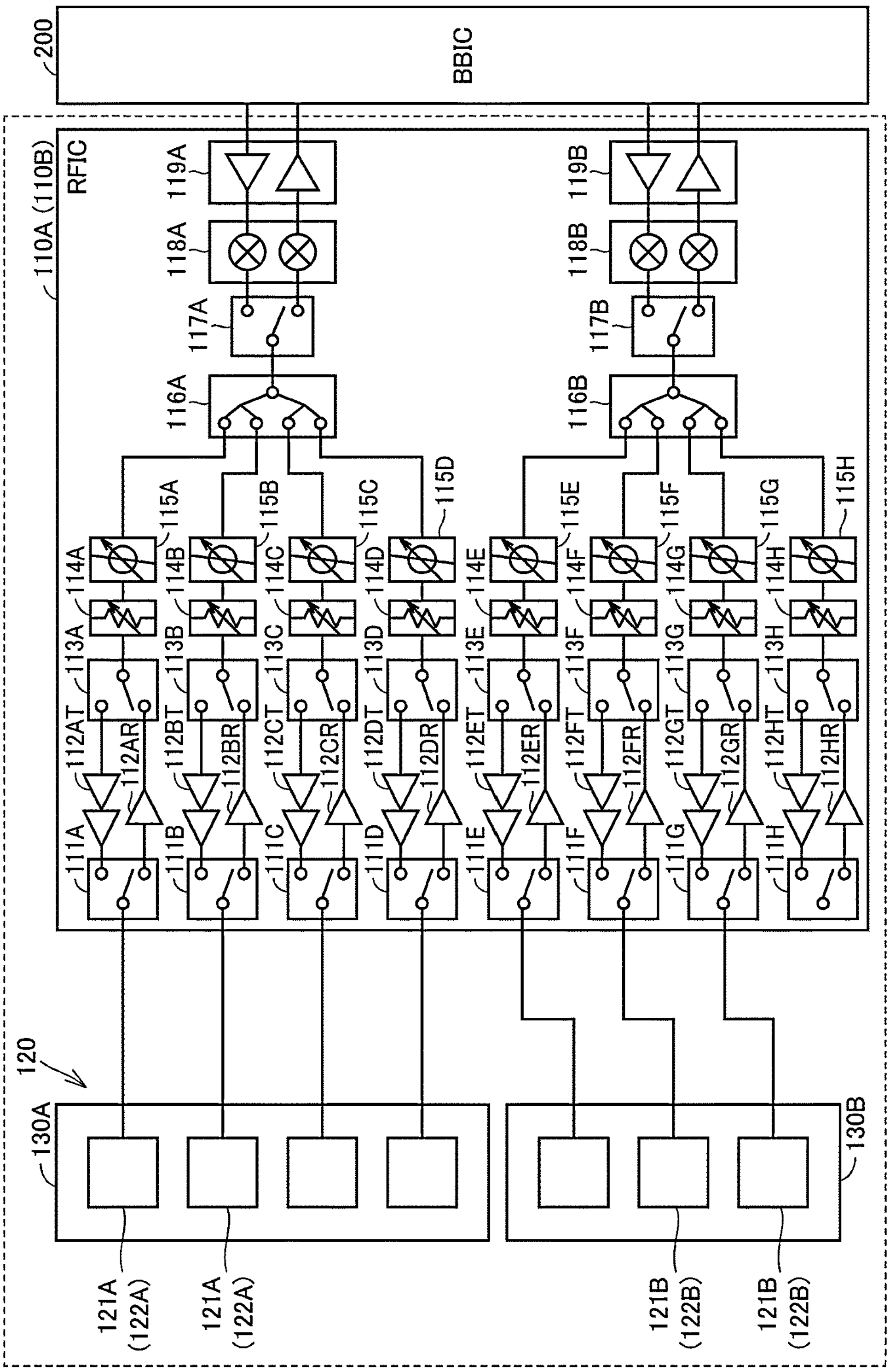
FIG. 2 is a diagram for describing a detailed configuration of RFICs of FIG. 1.

FIG. 2 is a diagram for describing a detailed configuration of the RFICs of FIG. 1. Note that, in FIG. 2, description will be made using circuits for the lower frequency band (the emitting elements 121A and 121B and the RFIC 110A) as an example; however, circuits for the higher frequency band basically have substantially the same configuration.

With reference to FIG. 2, the RFIC 110A includes switches 111A to 111H, 113A to 113H, 117A, and 117B, power amplifiers 112AT to 112HT, low noise amplifiers 112AR to 112HR, attenuators 114A to 114H, phase sifters 115A to 115H, signal multiplexing/demultiplexing devices 116A and 116B, mixers 118A and 118B, and amplification circuits 119A and 119B. Among these, the configurations of the switches 111A to 111D, 113A to 113D, and 117A, the power amplifiers 112AT to 112DT, the low noise amplifiers 112AR to 112DR, the attenuators 114A to 114D, the phase sifters 115A to 115D, the signal multiplexing/demultiplexing device 116A, the mixer 118A, and the amplification circuit 119A are circuits for the emitting element 121A on the dielectric substrate 130A side. Moreover, the configurations of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal multiplexing/demultiplexing device 116B, the mixer 118B, and the amplification circuit 119B are circuits for the emitting element 121B on the dielectric substrate 130B side. Note that, in the antenna module 100, the number of emitting elements 121B on the dielectric substrate 130B side is three, and thus an emitting element is not connected to a path connecting the switches 111H and 113H, the power amplifier 112HT, the low noise amplifier 112HR, the attenuator 114H, and the phase shifter 115H.

In a case where radio frequency signals are to be transmitted, the switches 111A to 111H and 113A to 113H are switched to the side where the power amplifiers 112AT to 112HT are provided, and also the switches 117A and 117B are connected to the transmission-side amplifiers of the amplification circuits 119A and 119B. In a case where radio frequency signals are to be received, the switches 111A to 111H and 113A to 113H are switched to the side where the low noise amplifiers 112AR to 112HR are provided, and also the switches 117A and 117B are connected to the reception-side amplifiers of the amplification circuits 119A and 119B.

Signals transmitted from the BBIC 200 are amplified by the amplification circuits 119A and 119B and are then up-converted by the mixers 118A and 118B. Transmission signals that are up-converted radio frequency signals are separated into four signals by the signal multiplexing/demultiplexing devices 116A and 116B, and the four signals pass through the corresponding signal paths and are fed to the emitting elements 121A and 121B. In this case, by separately adjusting the degrees of phase shift of the phase shifters 115A to 115H disposed in the respective signal paths, the directivity of the antenna device 120 can be adjusted. Moreover, the attenuators 114A to 114H adjust the strengths of transmission signals.

Reception signals, which are radio frequency signals received by the respective emitting elements 121A and 121B, are transmitted to the RFIC 110A, travel along the respective different signal paths, and are multiplexed by the signal multiplexing/demultiplexing devices 116A and 116B. The multiplexed reception signals are down-converted by the mixers 118A and 118B and are furthermore amplified by the amplification circuits 119A and 119B, and the resulting signals are transmitted to the BBIC 200.

The RFIC 110A is, for example, formed as a one-chip integrated circuit component including the above-described circuit configuration. Alternatively, the devices (the switches, the power amplifiers, the low noise amplifiers, the attenuators, the phase shifters) corresponding to the individual emitting elements 121A and 121B in the RFIC 110A may be formed as a one-chip integrated circuit component for each corresponding emitting element.

Note that FIGS. 1 and 2 illustrate the configuration for a case where radio waves having one polarization direction are emitted from the electrodes of the individual emitting elements. In the case of a so-called dual-polarization type antenna module capable of emitting radio waves in two different polarization directions from the electrodes of the individual emitting elements, an RFIC is further provided for each polarization and a radio frequency signal is supplied to each power supply point separately. Alternatively, a switching device may be provided between the RFIC and the emitting element and may supply the output from the RFIC to the power supply point for each polarization by switching the output.

Note that the "dielectric substrate 130A and dielectric substrate 130B" in the present embodiment correspond to a "first substrate" and a "second substrate" according to the present disclosure, respectively. The "emitting element 121A", the "emitting element 122A", the "emitting element 121B", and the "emitting element 122B" according to the embodiment correspond to a "first emitting element", a "second emitting element", a "third emitting element", and a "fourth emitting element" according to the present disclosure, respectively.

(Configuration of Antenna Module)

Next, with reference to FIG. 3, the configuration of the antenna module 100 according to the present embodiment will be described in detail. FIG. 3 is a perspective view of the antenna module 100.

The antenna module 100 includes the dielectric substrates 130A and 130B as described above, and is disposed on a mounting substrate 50, which is a substantially rectangular parallelepiped. Note that, in the following description, the normal direction of a main surface 51 of the mounting substrate 50 is the Z-axis, and the directions along two sides of the main surface 51 are the X-axis and Y-axis directions.

The dielectric substrates 130A and 130B are, for example, low temperature co-fired ceramic (LTCC) multilayer substrates, multilayer resin substrates formed by laminating a plurality of resin layers consisting of epoxy, polyimide, and other resins, multilayer resin substrates formed by laminating a plurality of resin layers consisting of liquid crystal polymers (LCPs) having lower dielectric constants, multilayer resin substrates formed by laminating a plurality of resin layers consisting of fluorine-based resins, or multilayer ceramic substrates other than LTCC multilayer substrates. Note that the dielectric substrates 130A and 130B do not have to have multilayer structures and may be single-layer substrates.

Each of the dielectric substrates 130A and 130B has a flat plate-like shape extending schematically in the X-axis direction. The dielectric substrate 130A and the dielectric substrate 130B are disposed such that their normal directions are different from each other. Specifically, the dielectric substrate 130A is disposed such that its normal direction matches the Z-axis direction, and the dielectric substrate 130B is disposed such that its normal direction matches the Y-axis direction. In other words, the dielectric substrate 130A is disposed so as to face the main surface 51 of the mounting substrate 50, and the dielectric substrate 130B is disposed so as to face a side surface 52 of the mounting substrate 50 along the X-axis. The RFIC 110 is disposed between the dielectric substrate 130A and the mounting substrate 50. Note that the normal direction of the dielectric substrate 130A and the normal direction of the dielectric substrate 130B do not have to be orthogonal to each other. For example, the angle formed between the two normal directions may range from 80° to 100°.

The dielectric substrate 130A and the dielectric substrate 130B are connected to each other by connection members 135. In the antenna module 100, the dielectric substrates 130A and 130B are almost equal in length in the X-axis direction, and the connection members 135 are formed at least both end portions of each dielectric substrate. Note that a connection member 135 may also be formed at middle portions of the dielectric substrates in the X-axis direction. Dielectric substrate torsion can be suppressed by connecting the end portions of the dielectric substrates to each other. When viewed in a plan view from the X-axis direction, the antenna device 120 is formed in a substantially L shape by the dielectric substrates 130A and 130B and the connection members 135.

A ground electrode GND is disposed over the entire surface of the side (back side) of the dielectric substrate A that faces the mounting substrate 50. The ground electrode GND extends from the dielectric substrate 130A through the connection members 135 to the dielectric substrate 130B.

The dielectric substrate 130A has a substantially rectangular shape when viewed in a plan view from its normal direction (the Z-axis direction). On the dielectric substrate 130A, three electrodes of the emitting element 121A are disposed along the X-axis direction. Moreover, on the dielectric substrate 130A, three electrodes of the emitting element 122A are disposed along the X-axis direction. The electrodes of the emitting element 121A and the electrodes of the emitting element 122A are disposed adjacent to each other along the X-axis direction in an alternating manner. Note that, in FIG. 3, the example is illustrated in which each electrode of the emitting elements 121A and 122A is exposed on the surface of the dielectric substrate 130A; however, each electrode of the emitting elements 121A and 122A may be disposed in or on an inner layer of the dielectric substrate 130A.

Each electrode of the emitting element 121A is arranged diagonally so that each side of the electrode forms 450 with respect to the X-axis direction. Each electrode of the emitting element 121A is disposed at the position where the distance from the end surface of the dielectric substrate 130A on the dielectric substrate 130B side to the center of the electrode of the emitting element 121A is L1.

Similarly, each electrode of the emitting element 122A is disposed diagonally so that each side of the electrode forms 45° with respect to the X-axis direction. Each electrode of the emitting element 122A is disposed at the position where the distance from the end surface of the dielectric substrate 130A on the dielectric substrate 130B side to the center of the electrode of the emitting element 122A is L2.

In this case, the distance L1 from the end portion of the dielectric substrate 130A is longer than the distance L2. That is, the emitting element 121A is disposed at a position that is farther from the dielectric substrate 130B than the emitting element 122A is.

In each electrode of the emitting elements 121A and 122A, radio frequency signals are supplied from the RFIC 110 to two power supply points. The power supply points of each electrode are positioned at 450 with respect to the direction parallel to the X-axis through the center of the electrode, and at 45° with respect to the direction parallel to the Y-axis through the center of the electrode. As a result, radio waves with a polarization direction at 45° with respect to the X-axis direction and radio waves with a polarization direction at 45° with respect to the Y-axis direction are emitted from each electrode of the emitting elements 121A and 122A.

When viewed in a plan view from the normal direction (the Y-axis direction), the dielectric substrate 130B has a substantially rectangular shape with notches formed at portions corresponding to the connection members 135. The dielectric substrate 130B has a protrusion 136 formed at the portion where the above-described notches are not formed, the protrusion 136 protruding in the Z-axis direction. In the region of the protrusion 136 of the dielectric substrate 130B, two electrodes of the emitting element 121B and two electrodes of the emitting element 122B are disposed along the X-axis direction. The electrodes of the emitting elements 121B and the electrodes of the emitting elements 122B are disposed along the X-axis direction in an alternating manner. Note that, in FIG. 3, the example is illustrated in which the emitting elements 121B and 122B are also exposed on the surface of the dielectric substrate 130B; however, the emitting elements 121B and 122B may be disposed in or on an inner layer of the dielectric substrate 130B.

Note that, although not illustrated in the drawing, radio frequency signals are supplied from the RFIC 110 to the emitting elements 121B and 122B through power feed lines that extend from the dielectric substrate 130A through the connection members 135 to the dielectric substrate 130B.

Each electrode of the emitting element 122B is arranged diagonally so that each side of the electrode is at 450 with respect to the X-axis direction. In each electrode of the emitting element 122B, radio frequency signals from the RFIC 110 are supplied to the two power supply points. The power supply points of each electrode of the emitting element 122B are positioned at 45° with respect to the direction parallel to the X-axis through the center of the electrode, and at 450 with respect to the direction parallel to the Z-axis through the center of the electrode. As a result, radio waves with a polarization direction at 450 with respect to the X-axis direction and radio waves with polarization at 450 with respect to the Z-axis direction are emitted from each electrode of the emitting element 122B.

In contrast, when viewed in a plan view from the normal direction (the Y-axis direction) of the dielectric substrate 130B, each electrode of the emitting element 121B has a substantially octagonal shape. This is because the size of the dielectric substrate 130B in the Z-axis direction is limited, and thus similarly to the emitting element 122B, the electrode is arranged at a 450 tilt in a state where four corners of the electrode, which has a square shape, are cut out. Even regarding each electrode of the emitting element 121B, the power supply points are positioned at 450 with respect to the direction parallel to the X-axis through the center of the electrode, and at 450 with respect to the direction parallel to the Z-axis through the center of the electrode. As a result, radio waves with a polarization direction at 450 with respect to the X-axis direction and radio waves with a polarization direction at 450 with respect to the Z-axis direction are emitted also from each electrode of the emitting element 121B.

Note that in a case where an end surface of the dielectric substrate 130A that is close to the dielectric substrate 130B is a first end surface, and an end surface of the dielectric substrate 130B that is close to the dielectric substrate 130A is a second end surface, assuming the dielectric substrate 130A is viewed in a plan view from its normal direction, a direction (a first direction) along the first end surface is the X-axis direction, and a direction (second direction) orthogonal to the direction along the first end surface is the Y-axis direction. Moreover, assuming the dielectric substrate 130B is viewed in a plan view from its normal direction, a direction (a third direction) along the second end surface is the X-axis direction, and a direction (a fourth direction) orthogonal to the direction along the second end surface is the Z-axis direction.

(Isolation Characteristics)

In an antenna module having a configuration as described above, in a case where the size of the dielectric substrate 130A in the Y-axis direction is limited, the emitting elements 121A and 122A of the dielectric substrate 130A are disposed so as to be close to the emitting elements 121B and 122B disposed on the dielectric substrate 130B. Basically, the direction of emission of radio waves from the emitting elements 121A and 122A is the positive direction of the Z-axis, and the direction of emission of radio waves from the emitting elements 121B and 122B is the negative direction of the Y-axis. However, assuming the emitting elements on the dielectric substrate 130A side are close to the emitting elements on the dielectric substrate 130B side, lines of electric force generated from the electrodes partially overlap and interfere with each other, and the isolation between the emitting elements of the dielectric substrate 130A and the emitting elements on the dielectric substrate 130B side may decrease.

In particular, in a dual-band antenna module such as the antenna module 100 according to the embodiment, the isolation is likely to decrease for radio waves in the lower frequency band, which have relatively longer electrical lengths, than for radio waves in the higher frequency band. This is because radio waves in the lower frequency band appear electrically closer due to the longer wavelength even at the same distance and because the emitting element for the lower frequency band is more likely to couple with the emitting elements on the dielectric substrate 130B side due to the electrode sizes of the emitting elements being larger than those of the electrodes for the higher frequency band.

In the antenna module 100 according to the present embodiment, the emitting element 121A of the dielectric substrate 130A for the lower frequency band is disposed at a position that is farther from the dielectric substrate 130B than the emitting element 122A for the higher frequency band is. In this manner, the deterioration of isolation characteristics can be suppressed by disposing, away from the dielectric substrate 130B, the emitting element 121A for the lower frequency band that has a greater effect on the deterioration of isolation.

Next, the isolation characteristics of the antenna module 100 according to the embodiment will be described using a comparative example.

FIG. 4 is a perspective view of an antenna module 100X according to the comparative example. In an antenna device 120X of the antenna module 100X, the arrangement of the emitting element 121A and the emitting element 122A is flipped on the dielectric substrate 130A. In other words, the emitting element 121A is disposed at a position that is closer to the dielectric substrate 130B than the emitting element 122A is. That is, a distance L1X from the end surface of the dielectric substrate 130A on the dielectric substrate 130B side to the center of each electrode of the emitting element 121A is shorter than a distance L2X from the end surface of the dielectric substrate 130A on the dielectric substrate 130B side to the center of each electrode of the emitting element 122A.

FIG. 5 illustrates simulation results of isolation for each frequency band in the antenna module 100 according to the embodiment and the antenna module 100X according to the comparative example. As illustrated in FIG. 5, in the lower frequency band (28 GHz band), the isolation in the embodiment is improved by about 5 dB. In contrast, in the higher frequency band (39 GHz band), the isolation in the embodiment is lower than that in the comparative example; however, the decrease is as low as about 2 dB. Thus, in terms of the entire antenna module, the isolation of the antenna module 100 according to the embodiment is improved more greatly than that of the antenna module 100X according to the comparative example.

As described above, in a dual-band antenna module capable of emitting radio waves in two different directions, the deterioration of isolation can be suppressed by disposing emitting elements on one dielectric substrate such that an emitting element for the lower frequency band is disposed at a position that is farther from the other dielectric substrate than an emitting element for the higher frequency band is.

Note that, in the antenna module 100 according to the embodiment, the configuration has been described in which the emitting elements 121B and 122B are separately disposed on the dielectric substrate 130B; however, the antenna module 100 according to the embodiment may have a stacking structure in which the electrodes of the emitting element 121B and the electrodes of the emitting element 122B are stacked in the normal direction (the Y-axis direction).

Moreover, in the antenna module 100, the polarization direction of radio waves emitted from each electrode of the emitting elements is tilted at 45° with respect to the coordinate axis in the drawing (for example, the X-axis); however, the tilt of the polarization direction is not limited to this and may be any angle greater than 0° and smaller than 90°.

[Modifications]

In the following, the configurations of antenna modules according to modifications will be described using FIGS. 6 to 9.

(First Modification)

In the antenna module 100 according to the embodiment, the case of the antenna array has been described in which each emitting element includes a plurality of electrodes. In a first modification, a case will be described in which each emitting element includes one electrode.

Figure 6:
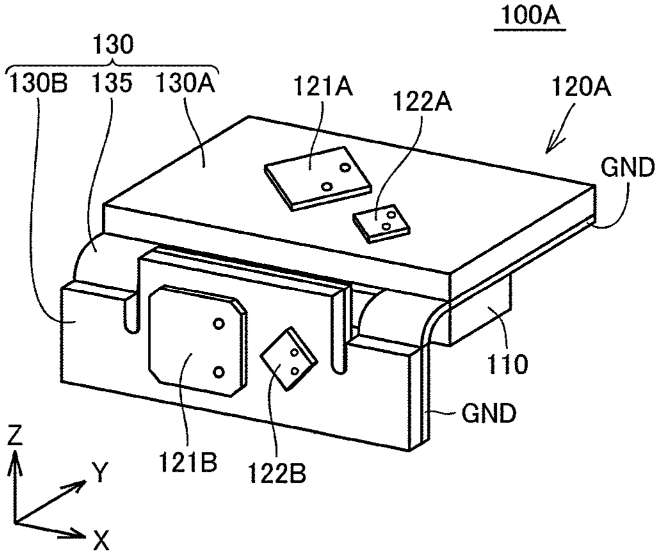
FIG. 6 is a perspective view of an antenna module according to a first modification.

FIG. 6 is a perspective view of an antenna module 100A according to the first modification. In an antenna device 120A of the antenna module 100A, each emitting element disposed on each dielectric substrate is constituted by one electrode. On the dielectric substrate 130A, the electrode of the emitting element 121A for the lower frequency band is disposed at a position that is farther from the dielectric substrate 130B than the emitting element 122A for the higher frequency band is.

In this manner, even in an antenna module including the emitting elements, each of which is constituted by a single electrode, the deterioration of isolation can be suppressed by disposing an emitting element for the lower frequency band at a position that is farther from the other dielectric substrate than an emitting element for the higher frequency band is.

(Second Modification)

In a second modification, a configuration will be described in which the polarization directions of the emitting elements on the dielectric substrate 130A side are made different.

Figure 7:
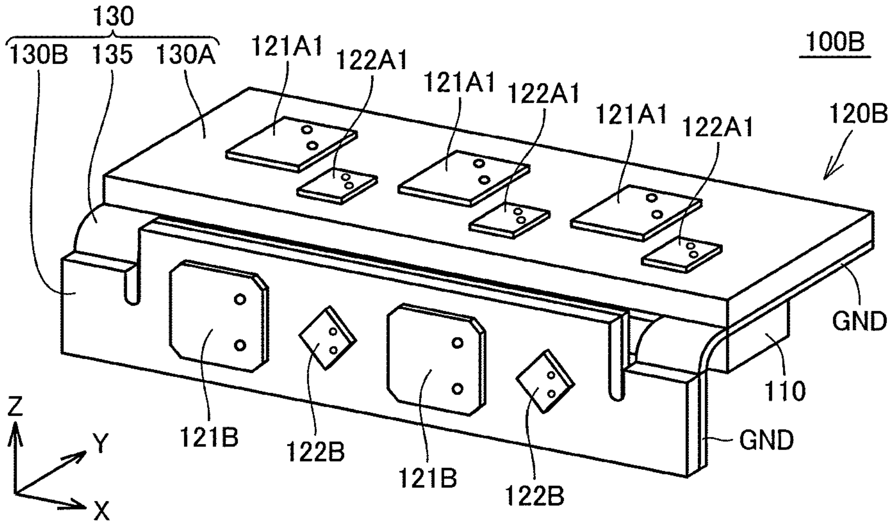
FIG. 7 is a perspective view of an antenna module according to a second modification.

FIG. 7 is a perspective view of an antenna module 100B according to the second modification. An antenna device 120B of the antenna module 100B has a configuration in which the emitting elements 121A and 122A of the antenna module 100 according to the embodiment in FIG. 3 are replaced with emitting elements 121A1 and 122A1. In FIG. 7, description of the elements that are also included in the antenna module 100 of FIG. 3 will not be repeated.

With reference to FIG. 7, three electrodes of the emitting element 121A1 and three electrodes of the emitting element 122A1 are separately disposed along the X-axis direction on the dielectric substrate 130A. Each electrode of the emitting elements 121A1 and 122A1 has a substantially square shape and is disposed such that each side of the electrode is parallel to the X-axis or the Y-axis.

On each of the electrodes of the emitting elements 121A1 and 122A1, power supply points are disposed at a position offset from the center of the electrode in the positive direction of the X-axis and a position offset from the center of the electrode in the positive direction of the Y-axis. That is, from the individual electrodes, radio waves whose polarization direction is the X-axis direction and radio waves whose polarization direction is the Y-axis direction are emitted.

Even in the antenna module 100B, the emitting element 121A1 of the dielectric substrate 130A for the lower frequency band is disposed at a position that is farther from the dielectric substrate 130B than the emitting element 122A1 for the higher frequency band is. Thus, the deterioration of isolation can be suppressed even in the antenna module 100B.

(Third Modification)

In a third modification, a configuration will be described in which the polarization directions of the emitting elements on the dielectric substrate 130B side are made different.

Figure 8:
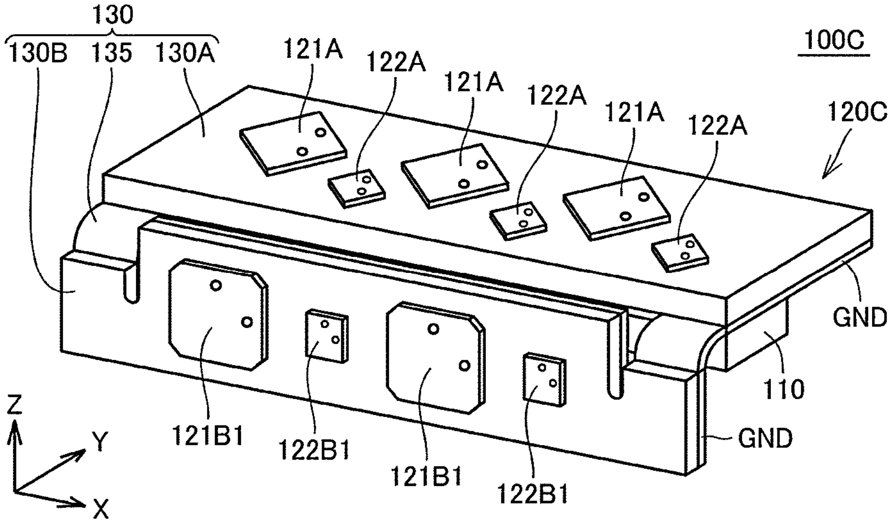
FIG. 8 is a perspective view of an antenna module according to a third modification.

FIG. 8 is a perspective view of an antenna module 100C according to the third modification. An antenna device 120C of the antenna module 100C has a configuration in which the emitting elements 121B and 122B of the antenna module 100 according to the embodiment in FIG. 3 are replaced with emitting elements 121B1 and 122B1. In FIG. 8, description of the elements that are also included in the antenna module 100 of FIG. 3 will not be repeated.

With reference to FIG. 8, two electrodes of the emitting element 121B1 and two electrodes of the emitting element 122B1 are separately disposed along the X-axis direction on the dielectric substrate 130B. Each electrode of the emitting elements 121B1 and 122B1 has a substantially square shape and is disposed such that each side of the electrode is parallel to the X-axis or the Z-axis.

On each of the electrodes of the emitting elements 121B1 and 122B1, power supply points are disposed at a position offset from the center of the electrode in the positive direction of the X-axis and a position offset from the center of the electrode in the positive direction of the Z-axis. That is, from the individual electrodes, radio waves whose polarization direction is the X-axis direction and radio waves whose polarization direction is the Z-axis direction are emitted.

Even in the antenna module 100C, the emitting element 121A of the dielectric substrate 130A for the lower frequency band is disposed at a position that is farther from the dielectric substrate 130B than the emitting element 122A for the higher frequency band is. Thus, the deterioration of isolation can be suppressed even in the antenna module 100C.

(Fourth Modification)

In a fourth modification, a configuration will be described in which the polarization directions of the emitting elements on both the dielectric substrate 130A side and the dielectric substrate 130B side are made different.

Figure 9:
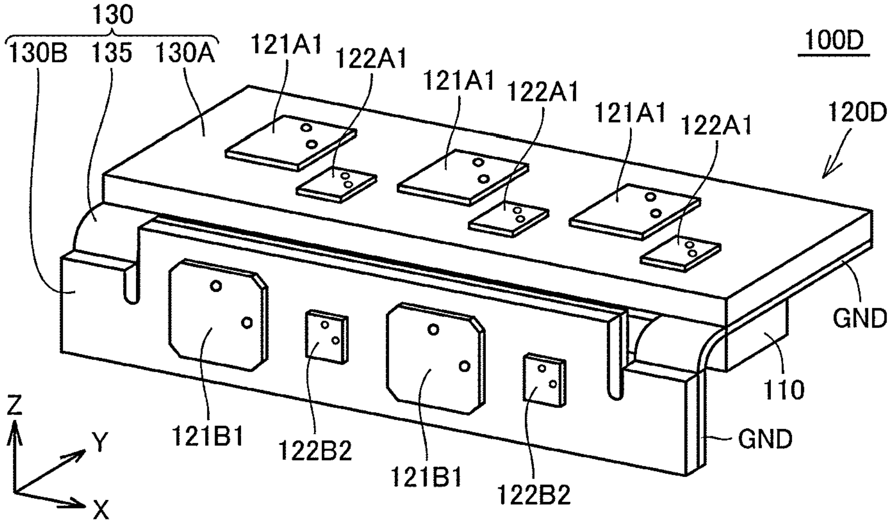
FIG. 9 is a perspective view of an antenna module according to a fourth modification.

FIG. 9 is a perspective view of an antenna module 100D according to the fourth modification. An antenna device 120D of the antenna module 100D has a configuration in which the emitting elements 121A and 122A of the antenna module 100 according to the embodiment in FIG. 3 are replaced with the emitting elements 121A1 and 122A1 and furthermore the emitting elements 121B and 122B are replaced with the emitting elements 121B1 and 122B2. In FIG. 9, description of the elements that are also included in the antenna module 100 of FIG. 3 will not be repeated.

With reference to FIG. 9, the three electrodes of the emitting element 121A1 and the three electrodes of the emitting element 122A1 are separately disposed along the X-axis direction on the dielectric substrate 130A. Each electrode of the emitting elements 121A1 and 122A1 has a substantially square shape and is disposed such that each side of the electrode is parallel to the X-axis or the Y-axis.

On each of the electrodes of the emitting elements 121A1 and 122A1, power supply points are disposed at a position offset from the center of the electrode in the positive direction of the X-axis and a position offset from the center of the electrode in the positive direction of the Y-axis. That is, from the individual electrodes, radio waves whose polarization direction is the X-axis direction and radio waves whose polarization direction is the Y-axis direction are emitted.

Moreover, the two electrodes of the emitting element 121B1 and the two electrodes of the emitting element 122B1 are separately disposed along the X-axis direction on the dielectric substrate 130B. Each electrode of the emitting elements 121B1 and 122B1 has a substantially square shape and is disposed such that each side of the electrode is parallel to the X-axis or the Z-axis.

On each of the electrodes of the emitting elements 121B1 and 122B1, power supply points are disposed at a position offset from the center of the electrode in the positive direction of the X-axis and a position offset from the center of the electrode in the positive direction of the Z-axis. That is, from the individual electrodes, radio waves whose polarization direction is the X-axis direction and radio waves whose polarization direction is the Z-axis direction are emitted.

Even in the antenna module 100D, the emitting element 121A1 of the dielectric substrate 130A for the lower frequency band is disposed at a position that is farther from the dielectric substrate 130B than the emitting element 122A1 for the higher frequency band is. Thus, the deterioration of isolation can be suppressed even in the antenna module 100D.

Note that, in the above-described embodiment and each modification, the "X-axis direction" corresponds to the "first direction" and the "third direction" according to the present disclosure, the "Y-axis direction" corresponds to the "second direction" according to the present disclosure, and the "Z-axis direction" corresponds to the "fourth direction" according to the present disclosure.

Note that, in the above-described embodiment and modifications, the configurations have been described in which the emitting elements 121 and 122 are separately disposed on the dielectric substrates; however, a configuration may be used in which a third emitting element corresponding to a frequency band (for example, 60 GHz) different from those of the emitting elements 121 and 122 is stacked on the emitting element 121 or the emitting element 122.

Moreover, in the above-described description, the cases where the emitting elements are patch antennas having flat plate-like shapes have been described; however, the emitting elements may be antennas having shapes other than patch antennas. For example, the emitting elements may be dielectric resonator antennas (DRAs).

The embodiments disclosed this time are to be considered exemplary and not restrictive in all respects. The scope of the present disclosure is indicated by the claims, not by the description of the embodiments above, and is intended to include all changes within the meaning and scope of the claims and those of equivalents of the claims.

REFERENCE SIGNS LIST

10 communication device
50 mounting substrate
51 main surface
52 side surface
100, 100A to 100D, 100X antenna module
110, 110A, 110B RFIC
111A to 111H, 113A to 113H, 117A, 117B switch
112AR to 112HR low noise amplifier
112AT to 112HT power amplifier
114A to 114H attenuator
115A to 115H phase shifter
116A, 116B signal multiplexing/demultiplexing device
118A, 118B mixer
119A, 119B amplification circuit
120, 120A to 120D, 120X antenna device
121A, 121A1, 121B, 121B1, 122A, 122A1, 122B, 122B1 emitting element
130, 130A, 130B dielectric substrate
135 connection member
136 protrusion
200 BBIC
GND ground electrode

The invention claimed is:

1. An antenna module comprising:

a first substrate and a second substrate, whose normal directions are different from each other;

a first emitting element capable of emitting radio waves of a first frequency band, the first emitting element being disposed on the first substrate;

a second emitting element capable of emitting radio waves of a second frequency band higher than the first frequency band, the second emitting element being disposed adjacent to the first emitting element in a case where the first substrate is viewed in a plan view from the normal direction;

a third emitting element capable of emitting radio waves of the first frequency band, the third emitting element being disposed on the second substrate; and a fourth emitting element capable of emitting radio waves of the second frequency band, the fourth emitting element being disposed on the second substrate, wherein, on the first substrate, the first emitting element is disposed at a position that is farther from the second substrate than the second emitting element, wherein a distance from a center of the first emitting element to an end surface of the first substrate that is close to the second substrate is longer than a distance from a center of the second emitting element to the end surface, and wherein each of the first emitting element, the second emitting element, the third emitting element, and the fourth emitting element is a planar electrode and is configured to be capable of emitting radio waves in two different polarization directions.

2. The antenna module according to claim 1, wherein in a case where the end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, the first emitting element and the second emitting element are configured to emit radio waves whose polarization direction is the first direction and radio waves whose polarization direction is the second direction, and the third emitting element and the fourth emitting element are configured to emit radio waves whose polarization direction is the third direction and radio waves whose polarization direction is the fourth direction.

3. The antenna module of claim 2, wherein each of the first emitting element, the second emitting element, the third emitting element, and the fourth emitting element is a planar electrode, the planar electrode having a first power supply point and a second power supply point, which are different from each other and to which radio frequency signals are supplied.

4. The antenna module according to claim 1, wherein in a case where the end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, the first emitting element and the second emitting element are configured to emit radio waves whose polarization direction is a direction that forms a first angle with the first direction and radio waves whose polarization direction is a direction that forms the first angle with the second direction, the third emitting element and the fourth emitting element are configured to emit radio waves whose polarization direction is the third direction and radio waves whose polarization direction is the fourth direction, and the first angle is greater than 0° and smaller than 90°.

5. The antenna module according to claim 1, wherein in a case where the end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, the first emitting element and the second emitting element are configured to emit radio waves whose polarization direction is the first direction and radio waves whose polarization direction is the second direction, the third emitting element and the fourth emitting element are configured to emit radio waves whose polarization direction is a direction that forms a second angle with the third direction and radio waves whose polarization direction is a direction that forms the second angle with the fourth direction, and the second angle is greater than 0° and smaller than 90°.

6. The antenna module according to claim 1, wherein in a case where the end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, the first emitting element and the second emitting element are configured to emit radio waves whose polarization direction is a direction that forms a first angle with the first direction and radio waves whose polarization direction is a direction that forms the first angle with the second direction, the third emitting element and the fourth emitting element are configured to emit radio waves whose polarization direction is a direction that forms a second angle with the third direction and radio waves whose polarization direction is a direction that forms the second angle with the fourth direction, and each of the first angle and the second angle is greater than 0° and smaller than 90°.

7. The antenna module according to claim 1, wherein each of the first emitting element, the second emitting element, the third emitting element, and the fourth emitting element is a planar electrode, the planar electrode having a first power supply point and a second power supply point, which are different from each other and to which radio frequency signals are supplied, and in a case where an end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, regarding the first emitting element and the second emitting element, the first power supply point is disposed at a position offset from a center of the planar electrode in the first direction, and the second power supply point is disposed at a position offset from the center of the planar electrode in the second direction, and regarding the third emitting element and the fourth emitting element, the first power supply point is disposed at a position offset from the center of the planar electrode in the third direction, and the second power supply point is disposed at a position offset from the center of the planar electrode in the fourth direction.

8. The antenna module according to claim 1, wherein each of the first emitting element, the second emitting element, the third emitting element, and the fourth emitting element is a planar electrode, the planar electrode having a first power supply point and a second power supply point, which are different from each other and to which radio frequency signals are supplied, and in a case where an end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, regarding the first emitting element and the second emitting element, an angle formed by a direction from a center of the planar electrode toward the first power supply point and the first direction and an angle formed by a direction from the center of the planar electrode toward the second power supply point and the second direction are a first angle, regarding the third emitting element and the fourth emitting element, the first power supply point is disposed at a position offset from a center of the planar electrode in the third direction, and the second power supply point is disposed at a position offset from the center of the planar electrode in the fourth direction, and the first angle is greater than 0° and smaller than 90°.

9. The antenna module according to claim 1, wherein each of the first emitting element, the second emitting element, the third emitting element, and the fourth emitting element is a planar electrode, the planar electrode having a first power supply point and a second power supply point, which are different from each other and to which radio frequency signals are supplied, and in a case where an end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, regarding the first emitting element and the second emitting element, the first power supply point is disposed at a position offset from a center of the planar electrode in the first direction, and the second power supply point is disposed at a position offset from the center of the planar electrode in the second direction, regarding the third emitting element and the fourth emitting element, an angle formed by a direction from a center of the planar electrode toward the first power supply point and the first direction and an angle formed by a direction from the center of the planar electrode toward the second power supply point and the second direction are a second angle, and the second angle is greater than 0° and smaller than 90°.

10. The antenna module according to claim 1, wherein each of the first emitting element, the second emitting element, the third emitting element, and the fourth emitting element is a planar electrode, the planar electrode having a first power supply point and a second power supply point, which are different from each other and to which radio frequency signals are supplied, and in a case where an end surface of the first substrate that is close to the second substrate is a first end surface and an end surface of the second substrate that is close to the first substrate is a second end surface, assuming a direction along the second end surface is a first direction and a direction orthogonal to the first direction is a second direction in a case where the first substrate is viewed in a plan view from the normal direction, and assuming a direction along the first end surface is a third direction and a direction orthogonal to the third direction is a fourth direction in a case where the second substrate is viewed in a plan view from the normal direction, regarding the first emitting element and the second emitting element, an angle formed by a direction from a center of the planar electrode toward the first power supply point and the first direction and an angle formed by a direction from the center of the planar electrode toward the second power supply point and the second direction are a first angle, regarding the third emitting element and the fourth emitting element, an angle formed by a direction from a center of the planar electrode toward the first power supply point and the first direction and an angle formed by a direction from the center of the planar electrode toward the second power supply point and the second direction are a second angle, and the first angle and the second angle are greater than 0° and smaller than 90°.

11. The antenna module according to claim 10, wherein the first angle is 45°.

12. The antenna module according to claim 10, wherein the second angle is 45°.

13. The antenna module according to claim 12, further comprising: a connection member that connects the first substrate and the second substrate.

14. The antenna module according to claim 13, wherein each of the first emitting element and the second emitting element includes a plurality of electrodes arranged in a direction along an end surface of the second substrate that is close to the first substrate.

15. The antenna module according to claim 14, wherein the electrodes of the first emitting element and the electrodes of the second emitting element are disposed in an alternating manner in a direction along the end surface of the second substrate that is close to the first substrate.

16. The antenna module according to claim 14, wherein each of the third emitting element and the fourth emitting element includes a plurality of electrodes arranged in a direction along the end surface of the first substrate that is close to the second substrate.

17. The antenna module according to claim 16, wherein the electrodes of the third emitting element and the electrodes of the fourth emitting element are disposed in an alternating manner in a direction along the end surface of the first substrate that is close to the second substrate.

18. The antenna module according to claim 17, further comprising: a power feed circuit that is disposed on the first substrate and is configured to supply a radio frequency signal to each emitting element.

19. A communication device equipped with the antenna module according to claim 1.

* * * * *